(12) United States Patent
Kang et al.

(10) Patent No.: US 9,833,747 B2
(45) Date of Patent: Dec. 5, 2017

(54) POLYMER ELECTROLYTE MEMBRANE CONTAINING NITRATE FOR SULFUR HEXAFLUORIDE SEPARATION

(71) Applicant: SANGMYUNG UNIVERSITY SEOUL INDUSTRY ACADEMY COOPERATION FOUNDATION, Seoul (KR)

(72) Inventors: Sang-Wook Kang, Seoul (KR); Woong-Gi Lee, Seoul (KR)

(73) Assignee: Sangmyung University Industry-Academy Cooperation Foundation, Seoul (KR)

( * ) Notice: Subject to any disclaimer, the term of this patent is extended or adjusted under 35 U.S.C. 154(b) by 0 days.

(21) Appl. No.: 15/044,436

(22) Filed: Feb. 16, 2016

(65) Prior Publication Data

US 2017/0189861 A1 Jul. 6, 2017

(30) Foreign Application Priority Data

Dec. 30, 2015 (KR) .................. 10-2015-0189587

(51) Int. Cl.
*B01D 53/22* (2006.01)
*B01D 69/14* (2006.01)
*B01D 71/02* (2006.01)
*B01D 71/62* (2006.01)

(52) U.S. Cl.
CPC ......... *B01D 69/148* (2013.01); *B01D 53/228* (2013.01); *B01D 71/024* (2013.01); *B01D 71/62* (2013.01); *B01D 2325/14* (2013.01); *B01D 2325/26* (2013.01)

(58) Field of Classification Search
CPC .... B01D 71/62; B01D 71/024; B01D 69/148; B01D 53/228; B01D 2325/26; B01D 2325/14

See application file for complete search history.

(56) References Cited

U.S. PATENT DOCUMENTS

| 3,091,554 A | * | 5/1963 | Rosser | B01D 69/148 106/190.1 |
| 3,734,897 A | * | 5/1973 | Stoy | B01D 67/0079 210/500.25 |
| 3,844,735 A | * | 10/1974 | Steigelmann | B01D 53/228 95/44 |

(Continued)

FOREIGN PATENT DOCUMENTS

| KR | 20130096877 | 9/2013 |
| KR | 20140014542 | 2/2014 |

(Continued)

OTHER PUBLICATIONS

Lee "Highly selective polymer electrolyte membranes consisting of poly(2-ethyl-2-oxazoline) and Cu(NO3)2 for SF6 separation." 6 pages, Sci. Rep. 6, 20430; doi: 10.1038/srep20430 (2016).*

*Primary Examiner* — Anthony Shumate
(74) *Attorney, Agent, or Firm* — IPLA P.A>; James E. Bame (57) ABSTRACT

Provided is a polymer electrolyte membrane for $SF_6$ separation, using a nitrate electrolyte, where the nitrate is solvated in the membrane to thus form ionic aggregates, whereby polar $SF_6$ has difficulty passing through the membrane due to the barrier effect of the ionic aggregates, thus enabling the separation of $SF_6$.

5 Claims, 3 Drawing Sheets

(56) References Cited

U.S. PATENT DOCUMENTS

| | | | | |
|---|---|---|---|---|
| 4,761,164 A * | 8/1988 | Pez | ............... | B01D 61/38 423/226 |
| 5,670,051 A * | 9/1997 | Pinnau | ............... | B01D 53/228 210/500.27 |
| 5,869,073 A * | 2/1999 | Sawan | ............... | A01N 25/24 424/404 |
| 2003/0183080 A1* | 10/2003 | Mundschau | ............... | B01D 71/022 95/55 |
| 2004/0191522 A1* | 9/2004 | Haring | ............... | B01D 67/0027 428/411.1 |
| 2005/0150383 A1* | 7/2005 | Kang | ............... | B01D 53/228 96/11 |
| 2005/0181928 A1* | 8/2005 | Hayward | ............... | B01D 67/0044 501/108 |
| 2005/0241477 A1* | 11/2005 | Mundschau | ............... | B01D 53/228 95/56 |
| 2007/0056256 A1* | 3/2007 | Tepper | ............... | A61L 9/16 55/527 |
| 2009/0169884 A1* | 7/2009 | Ekiner | ............... | B01D 61/145 428/398 |
| 2009/0270665 A1* | 10/2009 | Magalhaes Mendes | ............... | B01D 53/228 585/259 |
| 2010/0018394 A1* | 1/2010 | Ekiner | ............... | B01D 53/228 95/54 |
| 2010/0234650 A1* | 9/2010 | Cong | ............... | B01D 53/228 568/950 |
| 2013/0180913 A1* | 7/2013 | Sarkar | ............... | C02F 1/001 210/502.1 |
| 2013/0228515 A1* | 9/2013 | Yahaya | ............... | C07C 7/144 210/640 |
| 2014/0137740 A1* | 5/2014 | Aburaya | ............... | B01D 53/22 96/13 |
| 2014/0245884 A1* | 9/2014 | Feng | ............... | B01D 53/228 95/19 |
| 2014/0332459 A1* | 11/2014 | Hu | ............... | B01D 67/0004 210/295 |
| 2014/0378561 A1* | 12/2014 | Van Berchum | ............... | B01D 67/0006 521/27 |
| 2015/0020685 A1* | 1/2015 | Bhandari | ............... | B01D 69/088 96/10 |
| 2015/0141729 A1* | 5/2015 | Noda | ............... | C07C 7/144 585/818 |
| 2015/0231577 A1* | 8/2015 | Nair | ............... | B01D 71/024 210/640 |

FOREIGN PATENT DOCUMENTS

| KR | 20140035665 | 3/2014 |
|---|---|---|
| KR | 20150064371 | 6/2015 |

\* cited by examiner

POLYMER ELECTROLYTE MEMBRANE CONTAINING NITRATE FOR SULFUR HEXAFLUORIDE SEPARATION

BACKGROUND

The present invention relates to a polymer electrolyte membrane and, more particularly, to a polymer electrolyte membrane for $SF_6$ separation. The present invention relates to a polymer electrolyte membrane, which may be manufactured in any form, such as a hollow fiber type, a planar type, etc., and may exhibit superior $SF_6$ separation efficiency even without the use of an additional complicated module or device.

$SF_6$ is a typical electrical insulating material, and is used in the cleaning process upon manufacturing a semiconductor wafer or an LCD panel. However, $SF_6$ is known to have an effect on global warming as high as about 23900 times that of carbon dioxide. $SF_6$, which remains stably present in the air without decomposing for 3200 years, was identified as one of six materials having a high global warming index in the Kyoto climate change convention, 1997.

Methods of treating $SF_6$ used in various industrial processes include the decomposition of $SF_6$ and the separation and recycling of $SF_6$.

Since $SF_6$ is very stable, the decomposition processes thereof include plasma, electrical discharge, a spark method, etc., requiring high energy, and in the decomposition process, byproducts having high toxicity and corrosivity, such as $S_2F_{10}$, $SF_4$, and HF, are undesirably generated.

In consideration of continuous increases in the price of $SF_6$, as well as problems with $SF_6$ decomposition techniques, techniques for separating and recovering $SF_6$ that enable the recycling of $SF_6$ are receiving attention in place of decomposition techniques thereof. The techniques for separating and recovering $SF_6$ typically include cryogenics, PSA (Pressure Swing Adsorption), the use of a membrane, etc. Among these processes, the use of a membrane is adopted to recover $SF_6$ in the present invention.

Conventional patents related to techniques for separating and recovering $SF_6$ using a membrane are described below.

Korean Patent No. 10-1556707 discloses a membrane technique for $SF_6$ separation, involving coating a support with a coating solution, resulting from dissolving cellulose acetate and polyethylene glycol in a coating solvent mixture comprising acetic acid and isopropanol (IPA).

Korean Patent No. 10-1420767 discloses a technique for an $SF_6$ separation device using a hollow fiber membrane.

Korean Patent Nos. 10-1420082 and 10-1410914 disclose a technique for separating $SF_6$ that is generated during the production of a semiconductor.

Conventional $SF_6$ separation techniques using a membrane are mainly directed to membrane modules, rather than the development of membrane materials. The fabrication of modules having a complicated structure suffers from high costs and difficulty in manufacturing large-scale devices. Furthermore, $SF_6$ separation efficiency is still unsatisfactory.

SUMMARY OF THE INVENTION

Accordingly, the present invention has been made keeping in mind the above problems encountered in the related art, and an object of the present invention is to provide a novel polymer electrolyte membrane having high $SF_6$ separation efficiency. In particular, the present invention is intended to provide a polymer electrolyte membrane for $SF_6$ separation, which may be manufactured in any form, such as a planar type, a hollow fiber type, etc.

The present invention provides a polymer electrolyte membrane for $SF_6$ separation, comprising a polymer electrolyte layer containing a nitrate.

In particular, the polymer electrolyte layer is preferably formed on a porous support.

Furthermore, the polymer electrolyte membrane may be provided in a planar form or a hollow fiber form.

In particular, the nitrate may include any one selected from among 1-butyl-3-methylimidazolium nitrate, 1-ethyl-3-methylimidazolium nitrate, aluminum nitrate nonahydrate, ammonium cerium(IV) nitrate, ammonium nitrate, barium nitrate, beryllium nitrate, calcium nitrate hydrate, calcium nitrate tetrahydrate, cerium(III) nitrate hexahydrate, cesium nitrate, chromium(III) nitrate nonahydrate, cobalt(II) nitrate hexahydrate, copper(II) nitrate hemi(pentahydrate), copper(II) nitrate hydrate, copper(II) nitrate trihydrate, iron (III) nitrate nonahydrate, lead(II) nitrate, lithium nitrate, magnesium nitrate hexahydrate, manganese(II) nitrate hydrate, nickel(II) nitrate hexahydrate, palladium(II) nitrate, palladium(II) nitrate dihydrate, palladium(II) nitrate hydrate, potassium nitrate, silver nitrate, and sodium nitrate.

In particular, the polymer may include any one selected from among:
poly(2-hydroxyethyl methacrylate/methacrylic acid),
poly(2-hydroxypropyl methacrylate),
poly(acrylamide/acrylic acid),
polymethacrylamide,
polyacrylamide,
poly(3-chloro-2-hydroxypropyl-2-methacryloxyethyldimethylammonium chloride),
poly(acrylamide/2-methacryloxyethyltrimethylammonium bromide),
poly(2-methacryloxyethyltrimethylammnium bromide),
poly(2-vinyl-1-methylpyridinium bromide),
poly(N-vinylpyrrolidone),
poly(vinylamine) hydrochloride,
poly(1-lysine hydrobromide),
poly(2-vinylpyridine),
poly(2-vinylpyridine N-oxide),
poly(N-vinylpyrrolidone/2-dimethylaminoethyl methacrylate), dimethyl sulfate quaternary,
poly(4-vinylpyridine N-oxide),
poly(4-vinylpyridine),
poly(ethylene oxide-b-propylene oxide),
poly(vinyl alcohol), N-methyl-4(4'-formylstyryl)pyridinium methosulfate acetal,
poly(allyl amine),
poly(styrenesulfonic acid/maleic acid), sodium salt,
poly(methacrylic acid),
poly(ethylene/acrylic acid),
poly(ethyl acrylate/acrylic acid),
poly(acrylic acid),
polypropylene, isotactic,
poly(vinyl phosphoric acid), sodium salt,
poly(styrenesulfonic acid),
poly(N-vinyl acetamide),
poly(N-vinyl acetamide-co-sodium acrylate),
poly(N-methyl-N-vinyl acetamide) homopolymer,
poly(n-butyl acrylate/2-methacryloxyethyltrimethylammonium bromide),
cellulose, ethyl hydroxyethyl ether,
poly(vinylsulfonic acid),
poly(N-vinylpyrrolidone/vinyl acetate),
poly(styrenesulfonic acid/maleic acid),
cellulose, hydroxyethyl ether, cellulose, methyl hydroxyethyl ether,
poly(ethylene oxide),
poly(vinyl acetate),
poly(vinyl methyl ether),
poly(oxyethylene),
poly(vinyl alcohol),
poly(2-ethyl-2-oxazoline),
poly(diallyldimethylammonium chloride),
poly(maleic acid),
poly(1-glycerol methacrylate),
poly(butadiene/maleic acid), and
poly(vinylphosphonic acid).

In particular, the molar ratio of the polymer to the nitrate preferably ranges from 1:0.5~0.7.

According to the present invention, the polymer electrolyte membrane is configured such that an ionic aggregate of nitrate, formed by a solvent, functions as a barrier for preventing the transport of $SF_6$, thus decreasing $SF_6$ permeance, thereby separating $SF_6$ from a mixture comprising $SF_6$ and other gases. The polymer electrolyte membrane of the invention can prevent $SF_6$ from passing therethrough and allows inert gas, such as nitrogen gas mixed with $SF_6$, to pass therethrough, thereby separating $SF_6$.

In particular, the polymer electrolyte membrane alone can exhibit high $SF_6$ separation efficiency, even without the use of an additional complicated device, thus obviating a conventional complicated module or device, ultimately reducing manufacturing and operating costs.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

The present invention pertains to a technique for separating $SF_6$ using a polymer electrolyte membrane. The polymer electrolyte membrane according to the present invention includes a polymer and an electrolyte, the electrolyte being a nitrate containing $NO_3^-$ ions as anions. In the polymer electrolyte membrane according to the present invention, the nitrate is solvated by a solvent component that is left behind in a small amount in a polymer electrolyte membrane to thus form an ionic aggregate. When $Cu(NO_3)_2$ is used as the nitrate, the transport of $SF_6$, which is negatively charged, is blocked due to the cation component in the ionic aggregate, for example, $Cu^{2+}$, whereby $SF_6$ does not pass through the polymer electrolyte membrane according to the present invention, whereas non-reactive nitrogen passes through the membrane of the invention, thus enabling the separation of $SF_6$ due to this difference in permeance.

In the present invention, $NO_3^-$ efficiently undergoes solvation compared to the other anions, and thus facilitates the formation of an ionic aggregate in the polymer electrolyte membrane. The ionic aggregate enables the collection of ions on a large scale, compared to ion pairs or free ions. The ionic aggregate having a relatively large size is effective at blocking the transport of $SF_6$ through the polymer electrolyte membrane.

The polymer electrolyte membrane according to the present invention may be manufactured in any form, such as a hollow fiber type, a planar type, etc., and may be formed on a micropore-sized porous support, or may be provided in the form of a freestanding film without any porous support.

Figure 1:
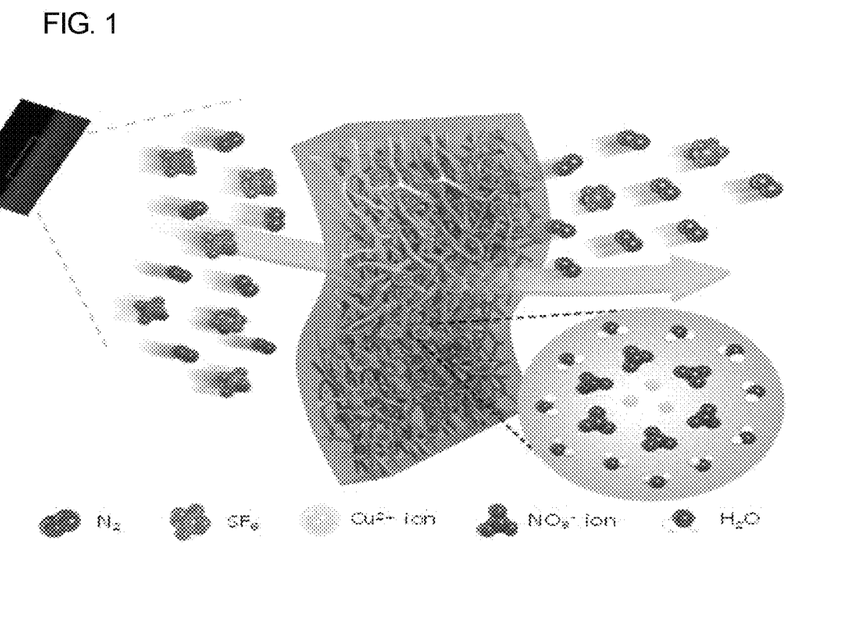
FIG. 1 illustrates the separation of $SF_6$ in a polymer electrolyte membrane according to the present invention.

FIG. 1 illustrates the $SF_6$ separation mechanism in the polymer electrolyte membrane according to the present invention when using $Cu(NO_3)_2$ as the electrolyte containing $NO_3^-$ ions. The $SF_6$ separation mechanism, which blocks the transport of $SF_6$ in the polymer electrolyte membrane according to the present invention, devised by the present inventors, is illustrated in FIG. 1.

The solvation of $Cu(NO_3)_2$ in the membrane is carried out by the solvent remaining in the membrane. The solvent component for dissolving a polymer and $Cu(NO_3)_2$, for example, water, may be left behind in a small amount in the membrane even after casting and drying of the mixed solution comprising a polymer and $Cu(NO_3)_2$, whereby $Cu(NO_3)_2$ is solvated by the solvent component remaining in the solid-phase membrane after the formation of such a film. Also, even when the solvent is supplied to the membrane (e.g. humidifying conditions) from outside upon the separation of $SF_6$, solvation of $Cu(NO_3)_2$ in the polymer electrolyte membrane is possible.

Below is a description of the "$SF_6$ separation mechanism" in the membrane according to the present invention. The polymer electrolyte membrane comprising POZ (poly(2-ethyl-2-oxazoline)) as a polymer and $Cu(NO_3)_2$ as an electrolyte is described below. Based on the following test results, $Cu(NO_3)_2$ is solvated by water and is thus provided in the form of an aggregate in a polymer matrix, in the polymer electrolyte membrane according to the present invention. Here, $Cu^{2+}$ is positioned at the inner core of the aggregate, $NO_3^-$ is positioned around the core, and the water solvent is positioned near $NO_3^-$, thereby forming a single ionic aggregate.

By virtue of the size of the ionic aggregate, which is relatively large compared to the ion pairs or free ions, $SF_6$ does not pass through the membrane. Hence, another gas, for example, nitrogen, has relatively high permeance, and $SF_6$ has relatively low permeance, consequently separating $SF_6$. This mechanism is described through the following test examples.

Test Example 1: Analysis of FT-IR

The polymer electrolyte membrane comprising POZ and $Cu(NO_3)_2$ was subjected to FT-IR analysis. In the following test, the solvent for POZ was water, and the solution of POZ and $Cu(NO_3)_2$ at a molar ratio of 1:0.5 was prepared in a manner in which 2.5 g of a 20% POZ solution in water was added with 0.473 g of $Cu(NO_3)_2$. The solution at a molar ratio of 1:0.7 was prepared by adding 2.5 g of a 20% POZ solution with 0.662 g of $Cu(NO_3)_2$.

As illustrated in FIG. 1, the aggregates of $Cu(NO_3)_2$ in the polymer electrolyte membrane according to the present invention are uniformly dispersed in the polymer chain. The ionic aggregates are solvated by some cations of water. The partially negatively charged water is assumed to be localized around the ionic aggregates. The non-polar $N_2$ gas is transferred through the polymer electrolyte membrane according to the present invention by means of Fickian transport, but $SF_6$ gas, having a high quadruple moment, may be subjected to high repulsive force with partial negative charges of water, and in particular, the transport of $SF_6$ molecules is regarded as being blocked by $Cu^{2+}$ cations.

In order to confirm the formation of the polymer electrolyte membrane comprising POZ and $Cu(NO_3)_2$, the interaction between the copper ions and the carbonyl group of the amide group of the polymer was measured through FT-IR spectroscopy. The results are shown in FIG. 2.

Figure 2:
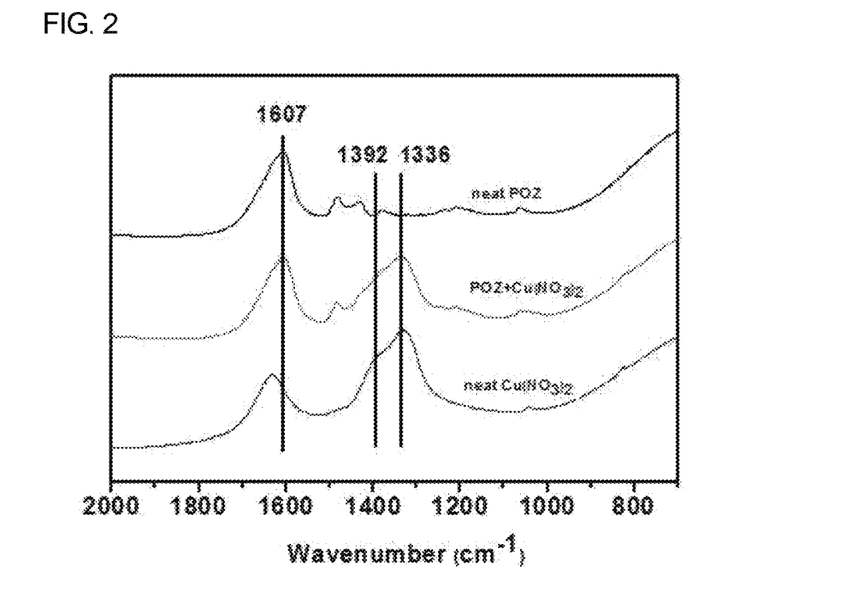
FIG. 2 is a graph illustrating the results of measurement of FT-IR in the polymer electrolyte membrane made of poly(2-ethyl-2-oxazoline) (POZ) and $Cu(NO_3)_2$, manufactured by the process according to the present invention.

As illustrated in FIG. 2, the spectrum of the membrane composed exclusively of POZ (hereinafter referred to as "neat POZ") showed an intense free C=O peak at 1607 $cm^{-1}$. In the membrane comprising POZ and $Cu(NO_3)_2$ (the molar ratio of POZ to $Cu(NO_3)_2$ is 1:0.7), it appeared that the shift of the free C=O peak at 1607 $cm^{-1}$ was negligible. Thus, the copper ions are considered to have no interaction with the carbonyl group in POZ.

Also, the stretching frequency of $NO_3^-$ is known to occur at 1336 $cm^{-1}$. When $Cu(NO_3)_2$ was incorporated into POZ, the peak intensity at 1392 $cm^{-1}$ was decreased and the peak of free $NO_3^-$ at 1336 $cm^{-1}$ became dominant. Hence, the ionic bonding of $Cu^{2+}$ ions and $NO_3^-$ ions was weakened by the interaction with hydrogen bonding of water as the solvent remaining in the polymer electrolyte membrane, consequently decreasing the stretching frequency.

Test Example 2: TGA

Figure 3:
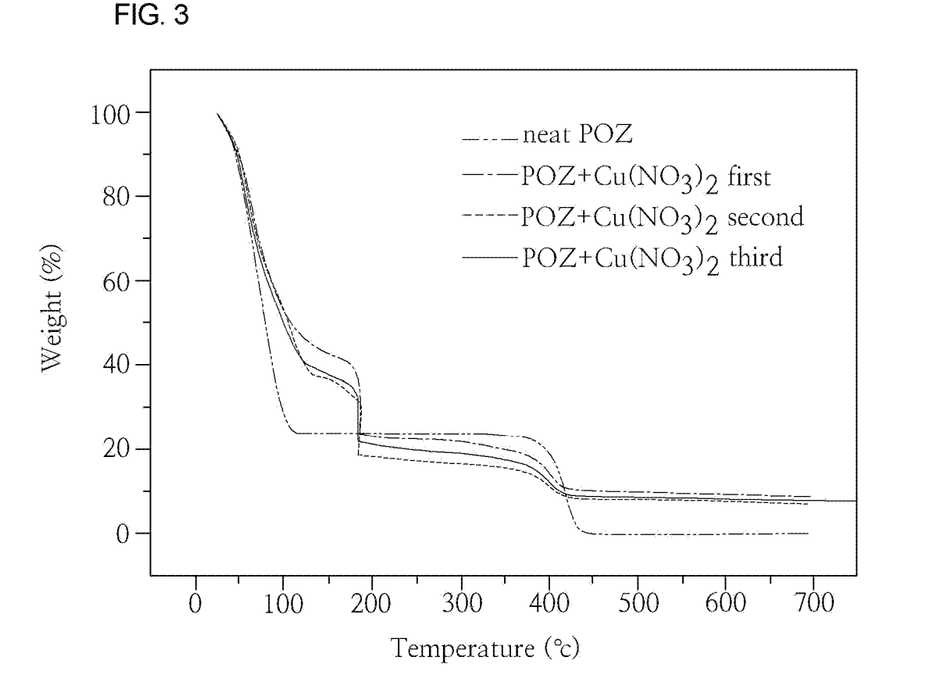
FIG. 3 is a graph illustrating the results of thermogravimetric analysis (TGA) of the POZ membrane and the polymer electrolyte membrane made of POZ/$Cu(NO_3)_2$ (1:0.7 molar ratio) manufactured by the process according to the present invention.

The thermal stability of a polymer electrolyte was evaluated using TGA. TGA was performed at a heating rate of 10° C./min using a Mettler Toledo TGA device. The results are shown in FIG. 3. Based on the results of TGA of the neat POZ and the POZ/$Cu(NO_3)_2$ (1:0.7 molar ratio), the neat POZ showed a weight reduction of 78% in the range from 0° C. to 100° C. This is due to the evaporation of water from the neat POZ film. In contrast, when $Cu(NO_3)_2$ was incorporated into the POZ polymer as in the polymer electrolyte membrane according to the present invention, the evaporation of water progressed at a high temperature of 100° C. or more, which is considered to be due to the solvation of $Cu(NO_3)_2$ by water. An increase in the decomposition temperature in the polymer electrolyte membrane according to the present invention is deemed to be because of the strong interaction between copper ions and water.

The boiling point of $Cu(NO_3)_2$ is known to be 170° C. In the polymer electrolyte membrane according to the present invention, a weight reduction of 20% at about 170° C. is considered to be due to $Cu(NO_3)_2$. Because of the decomposition of the polymer, all samples showed a weight reduction at about 400° C. Based on the above results, $Cu(NO_3)_2$ had no interaction with POZ, and $Cu(NO_3)_2$ was solvated by water, whereby the decomposition temperature of $Cu(NO_3)_2$ and water was increased.

Test Example 3: FT-Raman

Figure 4:
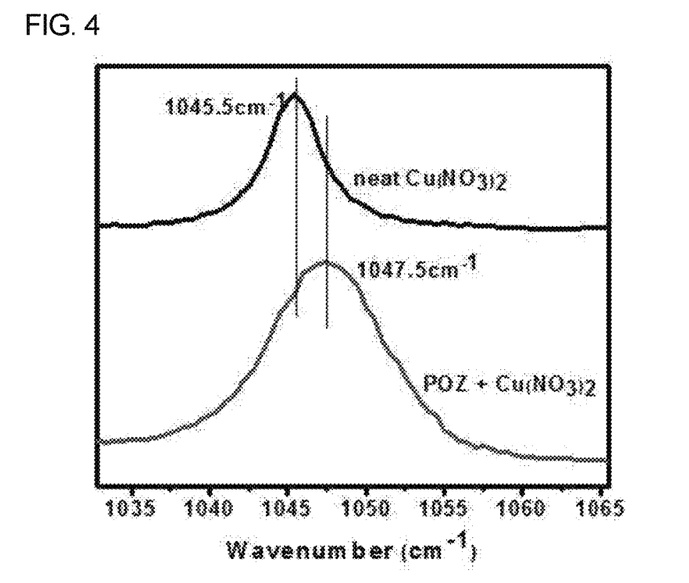
FIGS. 4 and 5 are graphs illustrating the results of measurement of FT-Raman in the polymer electrolyte membrane made of POZ/$Cu(NO_3)_2$ (1:0.7 molar ratio) manufactured by the process according to the present invention.

In the polymer electrolyte membrane according to the present invention, the formation of $Cu(NO_3)_2$ into ionic aggregates having a relatively large size in the POZ polymer, compared to free ions or ion pairs, was evaluated through FT-Raman. The results are illustrated in FIGS. 4 and 5.

$NO_3^-$ is known to show stretching bands 1034, 1040 and 1045 $cm^{-1}$. As illustrated in FIG. 4, when $Cu(NO_3)_2$ was incorporated into the POZ polymer, the number of $NO_3^-$ molecules was negligibly increased from 1045.5 to 1047.5 $cm^{-1}$, which means that $Cu(NO_3)_2$ that incorporated into POZ is mainly present as ionic aggregates.

Figure 5:
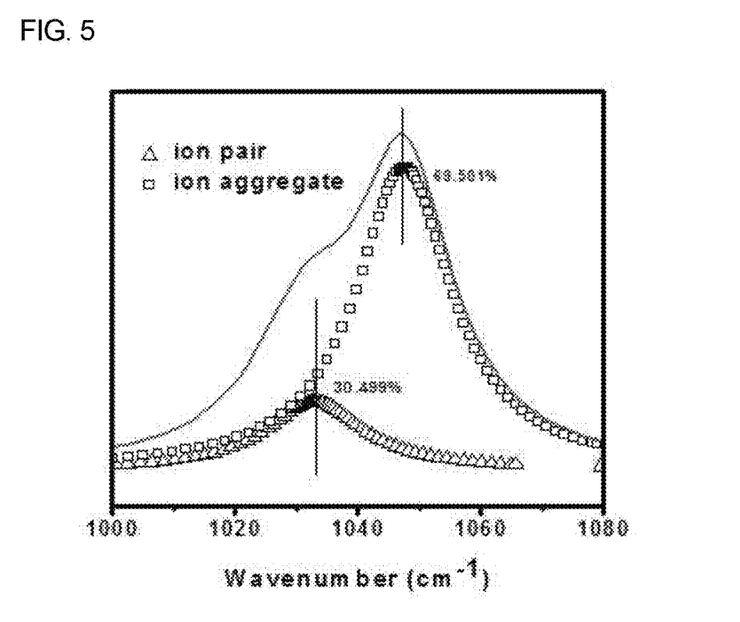

When $Cu(NO_3)_2$ is incorporated into the POZ polymer chain, the relative ratio of free ions, ion pairs and aggregates is illustrated in FIG. 5. There were no peaks at 1029 and 1034 $cm^{-1}$. Peaks at these locations are due to the free ions and the ion pairs. As illustrated in FIG. 5, respective peak areas of the free ions, ion pairs, and ionic aggregates were 14.829, 15.664 and 69.501%. Therefore, $Cu(NO_3)_2$ was present as higher-order ionic aggregates, rather than as free ions or ion pairs, in the POZ polymer. The ionic aggregates were dispersed in the polymer chain in the membrane of the invention.

Test Example 4: Permeance of POZ/$Cu(NO_3)_2$ Polymer Electrolyte Membrane

Figure 6:
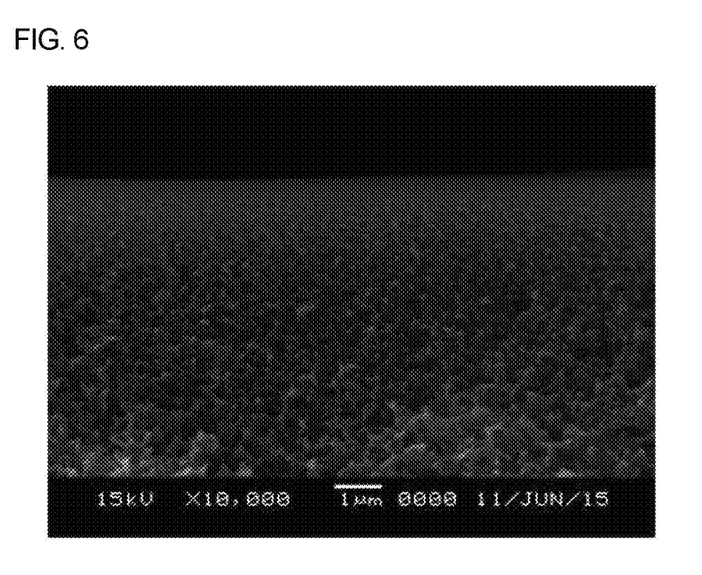
FIG. 6 is a scanning electron microscope (SEM) image illustrating the polymer electrolyte membrane made of POZ/$Cu(NO_3)_2$ (1:0.7 molar ratio) manufactured by the process according to the present invention.

A polymer electrolyte membrane including the $Cu(NO_3)_2$ aggregates as the transport barrier in the membrane for $SF_6$ separation was manufactured according to the present invention. The polymer electrolyte membrane according to the present invention was manufactured by preparing a POZ solution containing $Cu(NO_3)_2$, followed by coating a polysulfone macroporous support therewith, and drying it, in the same manner as in a typical process for forming a planar type membrane. FIG. 6 illustrates the SEM image of the membrane manufactured as above. When the polymer electrolyte solution was applied and dried on the support, the final thickness (excluding the support) was about 1 μm.

The $SF_6$ separation performance of the polymer electrolyte membranes according to the present invention, composed of POZ and $Cu(NO_3)_2$ at different molar ratios, was measured. The results are given in Table 1 below. At respective molar ratios (1:0.5 and 1:0.7), the $N_2$ gas permeance values were about 4.2 and 11.2 GPU, and the $SF_6$ gas permeance values were about 0.7 and 0.4 GPU.

TABLE 1

| mol ratio (POZ:$Cu(NO_3)_2$) | gas permeance (GPU) | | selectivity ($N_2$/$SF_6$) |
| --- | --- | --- | --- |
| | $N_2$ | $SF_6$ | |
| 1:0.5 | 4.2 | 0.7 | 6.0 |
| 1:0.7 | 11.2 | 0.4 | 28.0 |

The polymer electrolyte membrane comprising POZ/$Cu(NO_3)_2$ at a molar ratio of 1:0.7 exhibited high $N_2$ permeance and low $SF_6$ permeance. Although not shown in the above table, $SF_6$ gas permeance after two days was lowered to about 0.2 GPU. The polymer electrolyte membrane comprising POZ/$Cu(NO_3)_2$ at a molar ratio of 1:0.7 manifested a $N_2$/$SF_6$ gas selectivity of 28.0. As for the high $N_2$/$SF_6$ selectivity, when $Cu(NO_3)_2$ was solvated by water, repulsive force was increased between the negative charges of water and the F atoms of $SF_6$, and the barrier effect of $Cu^{2+}$ ions was increased.

Test Example 5: Test for Various Cations

In order to evaluate the $SF_6$ separation effect using the nitrate containing various cations, as shown in Table 2 below, the polymer membranes were manufactured using POZ (poly(2-ethyl-2-oxazoline)) as the polymer and the nitrate electrolyte containing various cations, and the permeance of $N_2$ and $SF_6$ was measured, and the theoretical selectivity ($N_2/SF_6$) was calculated. The results are given in Table 2 below. In the testing, the polymer and the nitrate at a fixed molar ratio of 1:0.7 were mixed in the solvent, after which the resulting mixture was cast and dried on the polysulfone porous support, thus forming films.

TABLE 2

| Nitrate | $SF_6$ Permeance | $N_2$ Permeance | Selectivity ($N_2/SF_6$) |
|---|---|---|---|
| 1-Butyl-3-methylimidazolium nitrate | 3.5 | 29.5 | 8.4 |
| 1-Ethyl-3-methylimidazolium nitrate | 2.9 | 27.3 | 9.4 |
| Aluminum nitrate nonahydrate | 6.1 | 23.5 | 3.9 |
| Ammonium cerium(IV) nitrate | 6.4 | 38.1 | 6.0 |
| Ammonium nitrate | 1.9 | 15.2 | 8 |
| Barium nitrate | 1.2 | 15.1 | 12.6 |
| Beryllium nitrate | 0.9 | 16.2 | 18 |
| Calcium nitrate hydrate | 4.5 | 31.8 | 7.1 |
| Calcium nitrate tetrahydrate | 1.8 | 31.2 | 17.3 |
| Cerium(III) nitrate hexahydrate | 3.2 | 37.8 | 11.8 |
| Cesium nitrate | 2.9 | 38.8 | 13.4 |
| Chromium(III) nitrate nonahydrate | 2 | 28.1 | 14.1 |
| Cobalt(II) nitrate hexahydrate | 5.1 | 16.2 | 3.2 |
| Copper(II) nitrate hemi(pentahydrate) | 3.7 | 18.7 | 5.1 |
| Copper(II) nitrate hydrate | 0.7 | 19.2 | 27.4 |
| Copper(II) nitrate trihydrate | 5.2 | 27.2 | 5.2 |
| Iron(III) nitrate nonahydrate | 4.5 | 18.5 | 4.1 |
| Lead(II) nitrate | 2.6 | 20.2 | 7.8 |
| Lithium nitrate | 1.1 | 16.5 | 15 |
| Magnesium nitrate hexahydrate | 3.2 | 17.2 | 5.4 |
| Manganese(II) nitrate hydrate | 4.9 | 25.6 | 5.2 |
| Nickel(II) nitrate hexahydrate | 0.8 | 19.2 | 24.0 |
| Palladium(II) nitrate | 0.6 | 20.9 | 34.8 |
| Palladium(II) nitrate dihydrate | 1.5 | 17.5 | 11.7 |
| Palladium(II) nitrate hydrate | 6.8 | 39.5 | 5.8 |
| Potassium nitrate | 1.6 | 24.4 | 15.3 |
| Silver nitrate | 1.8 | 28.4 | 15.78 |
| Sodium nitrate | 5.4 | 48.9 | 9.06 |

As is apparent from the above results, the selectivity varied depending on the kind of nitrate, but such nitrates could be used to separate $SF_6$.

Test Example 6: Test for Nitrate $Cu(NO_3)_2$ and Various Polymers

In order to evaluate the polymer effect in the polymer electrolyte layer, $Cu(NO_3)_2$ was used as the nitrate, and various polymers were used, thus preparing polymer electrolyte membranes, the permeance of $N_2$ and $SF_6$ and theoretical selectivity of which were calculated. The results are given in Table 3 below. In the testing, the polymer and $Cu(NO_3)_2$ at a fixed molar ratio of 1:0.7 were mixed in the solvent, after which the resulting mixture was cast and dried on the polysulfone porous support, thus forming films.

TABLE 3

| Polymer | $SF_6$ Permeance | $N_2$ Permeance | Selectivity ($N_2/SF_6$) |
|---|---|---|---|
| Cellulose, ethyl hydroxyethyl ether | 0.32 | 9.24 | 28.88 |
| Cellulose, hydroxyethyl ether | 0.26 | 8.24 | 31.69 |
| Cellulose, methyl hydroxyethyl ether | 0.94 | 18.24 | 19.40 |
| Poly(1-glycerol methacrylate) | 3.15 | 15.32 | 4.86 |
| Poly(2-ethyl-2-oxazoline) | 1.11 | 16.24 | 14.63 |
| Poly(2-hydroxyethyl methacrylate/methacrylic acid) | 2.5 | 22.5 | 9 |
| Poly(2-hydroxypropyl methacrylate) | 2.1 | 21.22 | 10.10 |
| Poly(2-methacryloxyethyltrimethylammonium bromide) | 5.12 | 35.21 | 6.88 |
| Poly(2-vinyl-1-methylpyridinium bromide) | 6.12 | 30.56 | 4.99 |
| Poly(2-vinylpyridine N-oxide) | 4.21 | 41.22 | 9.79 |
| Poly(2-vinylpyridine) | 3.65 | 30.62 | 8.39 |
| Poly(3-chloro-2-hydroxypropyl-2-methacryloxyethyldimethylammonium chloride) | 4.12 | 19.21 | 4.66 |
| Poly(4-vinylpyridine N-oxide) | 4.23 | 19.66 | 4.65 |
| Poly(4-vinylpyridine) | 6.65 | 34.65 | 5.21 |
| Poly(acrylamide/2-methacryloxyethyltrimethylammonium bromide) | 1.57 | 24.66 | 15.71 |
| Poly(acrylamide/acrylic acid) | 2.01 | 20.21 | 10.05 |
| Poly(acrylic acid) | 5.16 | 24.15 | 4.68 |
| Poly(allyl amine) | 1.24 | 32.54 | 26.24 |
| Poly(butadiene/maleic acid) | 2.55 | 36.25 | 14.22 |
| Poly(diallyldimethylammonium chloride) | 4.21 | 34.54 | 8.20 |
| Poly(ethyl acrylate/acrylic acid) | 4.42 | 27.78 | 6.29 |
| Poly(ethylene oxide) | 2.14 | 35.65 | 16.66 |
| Poly(ethylene oxide-b-propylene oxide) | 6.27 | 27.65 | 4.41 |
| Poly(ethylene/acrylic acid) | 1.94 | 19.24 | 9.92 |
| Poly(1-lysine hydrobromide) | 1.21 | 35.15 | 29.05 |
| Poly(maleic acid) | 6.45 | 32.15 | 4.98 |
| Poly(methacrylic acid) | 1.06 | 28.35 | 26.75 |
| Poly(n-butyl acrylate/2-methacryloxyethyltrimethyl ammonium bromide) | 1.45 | 28.64 | 19.75 |
| Poly(N-methyl N-vinyl acetamide) homopolymer | 1.64 | 37.52 | 22.88 |
| Poly(N-vinyl acetamide) | 0.61 | 15.22 | 24.95 |
| Poly(N-vinyl acetamide-co-sodium acrylate) | 2.15 | 21.36 | 9.93 |
| Poly(N-vinylpyrrolidone) | 6.12 | 15.26 | 2.49 |
| Poly(N-vinylpyrrolidone/2-dimethylaminoethyl methacrylate), dimethyl sulfate quaternary | 6.54 | 40.84 | 6.24 |

TABLE 3-continued

| Polymer | SF$_6$ Permeance | N$_2$ Permeance | Selectivity (N$_2$/SF$_6$) |
|---|---|---|---|
| Poly(N-vinylpyrrolidone/vinyl acetate) | 4.65 | 19.54 | 4.20 |
| Poly(oxyethylene) | 6.12 | 48.73 | 7.96 |
| Poly(styrenesulfonic acid) | 3.15 | 24.26 | 7.70 |
| Poly(styrenesulfonic acid/maleic acid), sodium salt | 1.26 | 38.9 | 30.87 |
| Poly(styrenesulfonic acid/maleic acid) | 0.65 | 10.32 | 15.88 |
| Poly(vinyl acetate) | 0.05 | 2.15 | 43.00 |
| Poly(vinyl alcohol), N-methyl-4(4'-formylstyryl)pyridinium methosulfate acetal | 1.95 | 19.65 | 10.08 |
| Poly(vinyl alcohol) | 3.99 | 16.28 | 4.08 |
| Poly(vinyl methyl ether) | 1.55 | 15.32 | 9.88 |
| Poly(vinyl phosphoric acid), sodium salt | 3.11 | 30.65 | 9.86 |
| Poly(vinylamine) hydrochloride | 0.87 | 12.12 | 13.93 |
| Poly(vinylphosphonic acid) | 1.98 | 25.26 | 12.76 |
| Poly(vinylsulfonic acid) | 5.11 | 16.24 | 3.18 |
| Polyacrylamide | 5.12 | 15.26 | 2.98 |
| Polymethacrylamide | 2.32 | 34.55 | 14.89 |
| Polypropylene, Isotactic | 1.21 | 26.25 | 21.69 |

As is apparent from the above results, SF$_6$ separation was possible when using polymer electrolyte membranes comprising various polymers and Cu(NO$_3$)$_2$ manufactured by the method of the invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A polymer electrolyte membrane for SF$_6$ separation, comprising an electrolyte layer of a polymer, wherein the electrolyte layer of the polymer comprises a nitrate, wherein a molar ratio of the polymer to the nitrate ranges from 1:0.5~0.7.

2. The polymer electrolyte membrane of claim 1, further comprising a porous support, wherein the electrolyte layer of the polymer is formed on the porous support.

3. The polymer electrolyte membrane of claim 1, wherein the polymer electrolyte membrane is provided in a planar form or a hollow fiber form.

4. The polymer electrolyte membrane of claim 1, wherein the nitrate consists of any one selected from among 1-butyl-3-methylimidazolium nitrate, 1-ethyl-3-methylimidazolium nitrate, aluminum nitrate nonahydrate, ammonium cerium (IV) nitrate, ammonium nitrate, barium nitrate, beryllium nitrate, calcium nitrate hydrate, calcium nitrate tetrahydrate, cerium(III) nitrate hexahydrate, cesium nitrate, chromium (III) nitrate nonahydrate, cobalt(II) nitrate hexahydrate, copper(II) nitrate hemi(pentahydrate), copper(II) nitrate hydrate, copper(II) nitrate trihydrate, iron(III) nitrate nonahydrate, lead(II) nitrate, lithium nitrate, magnesium nitrate hexahydrate, manganese(II) nitrate hydrate, nickel(II) nitrate hexahydrate, palladium(II) nitrate, palladium(II) nitrate dihydrate, palladium(II) nitrate hydrate, potassium nitrate, silver nitrate, and sodium nitrate.

5. The polymer electrolyte membrane of claim 1, wherein the polymer consists of any one selected from among:
poly(2-hydroxyethyl methacrylate/methacrylic acid),
poly(2-hydroxypropyl methacrylate),
poly(acrylamide/acrylic acid),
polymethacrylamide,
polyacrylamide,
poly(3-chloro-2-hydroxypropyl-2-methacryloxyethyl-dimethylammonium chloride),
poly(acrylamide/2-methacryloxyethyltrimethylammonium bromide),
poly(2-methacryloxyethyltrimethylammonium bromide),
poly(2-vinyl-1-methylpyridinium bromide),
poly(N-vinylpyrrolidone),
poly(vinylamine) hydrochloride,
poly(1-lysine hydrobromide),
poly(2-vinylpyridine),
poly(2-vinylpyridine N-oxide),
poly(N-vinylpyrrolidone/2-dimethylaminoethyl methacrylate), dimethyl sulfate quaternary,
poly(4-vinylpyridine N-oxide),
poly(4-vinylpyridine),
poly(ethylene oxide-b-propylene oxide),
poly(vinyl alcohol), N-methyl-4(4'-formylstyryl)pyridinium methosulfate acetal,
poly(allyl amine),
poly(styrenesulfonic acid/maleic acid), sodium salt,
poly(methacrylic acid),
poly(ethylene/acrylic acid),
poly(ethyl acrylate/acrylic acid),
poly(acrylic acid),
polypropylene, isotactic,
poly(vinyl phosphoric acid), sodium salt,
poly(styrenesulfonic acid),
poly(N-vinyl acetamide),
poly(N-vinyl acetamide-co-sodium acrylate),
poly(N-methyl-N-vinyl acetamide) homopolymer,
poly(n-butyl acrylate/2-methacryloxyethyltrimethylammonium bromide),
cellulose, ethyl hydroxyethyl ether,
poly(vinylsulfonic acid),
poly(N-vinylpyrrolidone/vinyl acetate),
poly(styrenesulfonic acid/maleic acid),
cellulose, hydroxyethyl ether,
cellulose, methyl hydroxyethyl ether,
poly(ethylene oxide),
poly(vinyl acetate),
poly(vinyl methyl ether),
poly(oxyethylene),
poly(vinyl alcohol),
poly(2-ethyl-2-oxazoline),
poly(diallyldimethylammonium chloride), poly(maleic acid),
poly(1-glycerol methacrylate),
poly(butadiene/maleic acid), and
poly(vinylphosphonic acid).

* * * * *